(12) United States Patent
Ishige et al.

(10) Patent No.: US 7,384,687 B2
(45) Date of Patent: *Jun. 10, 2008

(54) STRETCHED RESIN FILM

(75) Inventors: Atsushi Ishige, Ibaraki (JP); Kazuhisa Kitamura, Ibaraki (JP)

(73) Assignee: Yupo Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/400,866

(22) Filed: Mar. 28, 2003

(65) Prior Publication Data

US 2004/0023023 A1 Feb. 5, 2004

Related U.S. Application Data

(63) Continuation-in-part of application No. PCT/JP01/08438, filed on Sep. 27, 2001.

(30) Foreign Application Priority Data

| Sep. 29, 2000 | (JP) | ............................. 2000-298434 |
| Sep. 29, 2000 | (JP) | ............................. 2000-298435 |

(51) Int. Cl.
*B32B 27/32* (2006.01)
*C08J 7/04* (2006.01)

(52) U.S. Cl. ............................... 428/319.9; 428/318.6; 428/319.3; 428/319.7; 428/516; 428/517; 428/521; 428/523; 428/910

(58) Field of Classification Search ............. 428/319.7, 428/319.9, 516, 517, 521, 523, 910, 519, 428/318.6, 319.3
See application file for complete search history.

(56) References Cited

U.S. PATENT DOCUMENTS

| 5,532,030 | A | * | 7/1996 | Hirose et al. ............... 428/35.7 |
| 5,573,717 | A | | 11/1996 | Peiffer et al. ............... 264/45.1 |
| 5,939,181 | A | * | 8/1999 | Kumano et al. ......... 428/315.5 |
| 6,068,936 | A | * | 5/2000 | Peiffer et al. ............... 428/500 |

FOREIGN PATENT DOCUMENTS

| EP | 0 384 694 A | 8/1990 |
| EP | 0 666 183 | 8/1995 |
| EP | 0 732 195 | 9/1996 |
| EP | 0 736 374 | 10/1996 |
| EP | 0 845 490 | 6/1998 |
| JP | 4-27544 | 1/1992 |
| JP | 7-133363 | 5/1995 |
| JP | 10-273547 | 10/1998 |
| JP | 2000-109587 | 4/2000 |
| JP | 2000-167994 | 6/2000 |
| JP | 2000-319424 | 11/2000 |
| WO | WO 01/38434 | 5/2001 |

* cited by examiner

*Primary Examiner*—D. S Nakarani
(74) *Attorney, Agent, or Firm*—Oblon, Spivak, McClelland, Maier & Neustadt, P.C.

(57) ABSTRACT

Disclosed is a stretched resin film comprising a layer (A) stretched in at least one axial direction and comprising 0 to 98 wt % of a polyolefinic resin, 2 wt % or more and less than 100 wt % of an amorphous resin and more than 0 wt % and 70 wt % or less of an inorganic finepowder and/or an organic filler. The stretched resin film of the present invention is resistant to becoming waved when offset-printed with widely-used, quick-drying offset printing inks, and thus has excellent printing properties.

10 Claims, No Drawings

STRETCHED RESIN FILM

FIELD OF THE INVENTION

The present invention relates to a stretched resin film which is resistant to becoming waved or curled due to contact with the vehicle of offset printing inks during offset printing, and thus has excellent printing properties. The stretched resin film of the present invention may be used as a material for maps, book covers, wrapping paper, book paper, sticker sheets, poster paper, menu sheets, hanging screens, labels, shopping bags, cardboard, brochures, illuminated sign board and so forth.

BACKGROUND ART

Synthetic paper has been proposed and put into practical use in recent years to replace conventional natural pulp-made paper. The synthetic paper comprises a base layer made of a biaxially stretched polypropylene film containing 5 to 40 wt % of an inorganic finepowder, and paper-like layers disposed on the top and bottom surfaces thereof, made of a uniaxially stretched polypropylene film containing 8 to 65 wt % of an inorganic finepowder (e.g., as described in U.S. Pat. No. 4,318,950, Japanese Examined Patent Publication (KOUKOKU) Nos. 46-40794, 60-36173 and 62-35412).

Offset printing, (i.e., lithography), is generally used for printing on paper, polyethylene terephthalate film, polyamide film, coated paper and the like, since this technique can readily provide multi-color printing. The typical composition of a widely-used, drying-type offset printing ink is shown below.

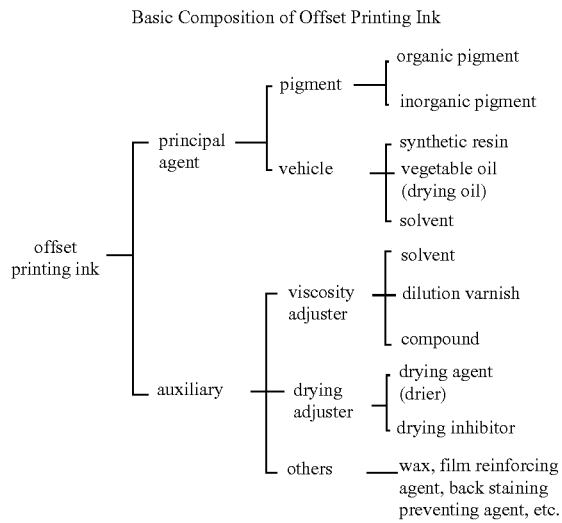

Basic Composition of Offset Printing Ink

TABLE 1

Composition of Offset Printing Ink (weight part)

|  | Ink for sheet printing | Ink for non-paper printing | Ink for rotary offset press |
|---|---|---|---|
| Pigment | 25 | 25 | 25 |
| Resin | 25 | 30 | 25 |
| Drying oil | 20 | 34 | 10 |

TABLE 1-continued

Composition of Offset Printing Ink (weight part)

|  | Ink for sheet printing | Ink for non-paper printing | Ink for rotary offset press |
|---|---|---|---|
| High-boiling-point, petroleum-base solvent | 25 | 5 | 36 |
| Drier | 1 | 2 | — |
| Others | 4 | 4 | 4 |
| Total | 100 | 100 | 100 |

The vehicle shown above refers to a liquid component, among the various components of which the printing ink is composed, which has the function of dispersing the pigment, thereby imparting the fluidity of the ink; ensuring the smooth flow of the ink from the ink pot to a printing surface while the ink is transferred among individual rollers, the printing plate and printing blanket; and for fixing the pigment onto the printing surface by solidification of the vehicle after printing. In response to the recent strong requirement that the offset printing ink have a shortened drying time to allow more rapid printing, there is an increasing trend toward the use of quick-drying inks which are compounded with a vehicle which is mainly comprised of a drying oil mixed with resin and mineral oil (high-boiling-point, petroleum-base solvent).

However, synthetic paper comprising a stretched polyolefinic film or such film compounded with an inorganic finepowder is printed with such quick-drying offset printing inks, vehicle of the quick-drying offset printing ink swells the polyolefin of the synthetic paper, thereby producing local surface waving or curling of the printed film. This is a significant practical obstacle in using such synthetic papers. Conventional offset printing inks for polyolefinic film are therefore specially formulated to be free from mineral oil. However, this approach sacrifices the quick-drying property.

In addition, such special offset printing inks for polyolefinic films require long drying times, and are used mainly in small specialty printing shops and manufacturers. There has therefore been a strong need for a new polyolefinic film on which the widely-used offset printing ink of the oxidation polymerization type (drying oil type) may be used.

In other words, in the typical printing shop, offset printing is practiced on pulp-based paper such as wood free paper and coated paper using generally-commercialized, quick-drying ink. Printing on polyolefinic film or synthetic paper in such printing shops requires the temporary replacement of such ink with the special offset printing ink which is suitable for such non-absorbent material. However, replacement of the conventional ink for pulp-based paper is time- and labor-consuming. As a consequence, conventional print shops have resisted printing on polyolefinic film or synthetic paper, which has been one factor preventing the general use of polyolefinic film or synthetic paper in offset printing.

One approach to solving this problem has been suggested in Japanese Unexamined Patent Publication (KOKAI) No. 8-333466, in which a polyolefinic resin mixed with an amorphous resin is used as a part of the multilayered film. However, this approach is still not completely successful in solving the problem of the swelling of the film (referred to as "solvent attack" hereinafter) due to the vehicle (in particular high-boiling-point, petroleum-based solvents such as mineral oil) in the offset printing ink. Another approach to solving the solvent attack has been suggested in Japanese Patent Unexamined Publication (KOKAI) No. 8-276540, in which a polyolefinic resin mixed with a petroleum resin is used to produce a multilayered film. However, this approach is not successful in solving the solvent attack in a practical level.

In view of the problems in the prior art, it is an object of the present invention to provide a stretched resin film having excellent printing properties, which is less prone to surface waving, even if the film is printed with widely-used, quick-drying offset printing ink.

DISCLOSURE OF THE INVENTION

The present inventors found after extensive investigations that adding an amorphous resin and an inorganic finepowder and/or an organic filler in a proper ratio to a polyolefinic resin can successfully provide a stretched resin film solving the problem of solvent attack and having excellent printing properties. The present invention was completed based on the findings.

The present invention provides a stretched resin film comprising a layer (A) stretched in at least one axial direction and comprising 0 to 98 wt % of a polyolefinic resin, 2 wt % or more and less than 100 wt % of an amorphous resin and more than 0 wt % and 70 wt % or less of an inorganic finepowder and/or an organic filler.

In the stretched resin film of the present invention, the layer (A) preferably has a porosity of more than 5% and a layer (B) comprising 30 to 100 wt % of a polyolefinic resin, and 0 to 70 wt % of an inorganic finepowder and/or an organic filler is preferably formed on at least one surface of the layer (A). The layer (A) or the layer (B) is preferably the outermost layer. The stretched resin film of the present invention preferably has a layer structure selected from (A)/(B), (A)/(B)/(A), (A)/(B)/(A)/(B), (A)/(B)/(A)/(B)/(A), (B)/(A)/(B) and (B)/(A)/(B)/(A)/(B). In the stretched resin film of the present invention, a layer (C) comprising 0 to 85 wt % of a polyolefinic resin and 15 to 100 wt % of an amorphous resin is preferably formed on at least one of the layer (A) or the layer (B) to obtain a layer structure selected from (A)/(C), (A)/(B)/(C), (A)/(C)/(B), (A)/(C)/(A), (C)/(A)/(C), (A)/(B)/(C)/(B), (A)/(B)/(A)/(C), (A)/(C)/(A)/(B), (A)/(C)/(A)/(C), (C)/(A)/(B)/(C), (A)/(C)/(B)/(A), (A)/(C)/(B)/(C), (A)/(C)/(B)/(C)/(A), (A)/(B)/(C)/(A)/(B), (A)/(B)/(C)/(A)/(C), (A)/(B)/(C)/(A), (A)/(B)/(C)/(B)/(C), (A)/(C)/(A)/(B)/(C), (A)/(B)/(C)/(B)/(A), (A)/(B)/(C)/(B)/(C), (A)/(B)/(A)/(C)/(C), (A)/(B)/(A)/(C)/(A), (A)/(C)/(A)/(C)/(B), (A)/(C)/(A)/(C)/(A), (A)/(C)/(A)/(C)/(B), (A)/(C)/(B)/(A)/(B), (A)/(C)/(B)/(A)/(C), (A)/(C)/(B)/(C)/(B), (C)/(A)/(B)/(A)/(C), (C)/(A)/(C)/(A)/(C), (C)/(A)/(C)/(B)/(C), (C)/(B)/(A)/(B)/(C), (B)/(A)/(C), (B)/(A)/(B)/(C), (B)/(A)/(C)/(B), (B)/(A)/(C)/(A)/(B), (B)/(A)/(C)/(A)/(C), (B)/(A)/(C)/(B)/(C), (B)/(A)/(C)/(B)/(C), (B)/(A)/(B)/(C)/(B), (B)/(C)/(A)/(B)/(C), (B)/(C)/(A)/(C)/(B) and (B)/(C)/(B)/(A)/(C). A pigment coated layer is preferably formed on at least one outermost surface of the stretched resin film. The amorphous resin used for the stretched resin film is preferably a cyclic olefin resin and preferably has a glass transition temperature of 140° C. or less. The polyolefinic resin used for the stretched resin film is preferably a propylene-based resin, an ethylene-based resin or a mixture thereof.

BEST MODE FOR CARRYING OUT THE INVENTION

The Stretched resin film of the present invention is described in detail hereinafter. It should now be noted that, in this specification, any notation using a word "to" indicates a range defined by values placed before and after such word, where both ends of such range are included as minimum and maximum values.

The stretched resin film of the present invention comprises as an essential component a layer (A) stretched in at least one axial direction and comprising 0 to 98 wt % of a polyolefinic resin, 2 wt % or more and less than 100 wt % of an amorphous resin and more than 0 wt % and 70 wt % or less of an inorganic finepowder and/or an organic filler. The stretched resin film of the present invention may have a layer (B) comprising 30 to 100 wt % of a polyolefinic resin, and 0 to 70 wt % of an inorganic finepowder and/or an organic filler is preferably formed on at least one surface of the layer (A) in a layer structure of (A)/(B), (A)/(B)/(A), (A)/(B)/(A)/(B), (A)/(B)/(A)/(B)/(A), (B)/(A)/(B) or (B)/(A)/(B)/(A)/(B); and may have a layer (C) comprising 0 to 85 wt % of a polyolefinic resin and 15 to 100 wt % of an amorphous resin in the layer structure of (A)/(C), (A)/(B)/(C), (A)/(C)/(B), (A)/(C)/(A), (C)/(A)/(C), (A)/(B)/(C)/(B), (A)/(B)/(A)/(C), (A)/(C)/(A)/(B), (A)/(C)/(A)/(C), (C)/(A)/(B)/(C), (A)/(C)/(B)/(A), (A)/(C)/(B)/(C), (A)/(C)/(B)/(C)/(A), (A)/(B)/(C)/(A)/(B), (A)/(B)/(C)/(A)/(C), (A)/(B)/(C)/(B)/(A), (A)/(B)/(C)/(B)/(C), (A)/(B)/(A)/(B)/(C), (A)/(B)/(A)/(C)/(B), (A)/(C)/(A)/(B)/(C), (A)/(C)/(A)/(C), (A)/(C)/(A)/(C)/(B), (A)/(C)/(B)/(A)/(B), (A)/(C)/(B)/(A)/(C), (C)/(A)/(B)/(A)/(C), (C)/(A)/(C)/(A)/(C), (C)/(A)/(C)/(B)/(C), (C)/(B)/(A)/(B)/(C), (B)/(A)/(C), (B)/(A)/(B)/(C), (B)/(A)/(C)/(B), (B)/(A)/(C)/(A)/(B), (B)/(A)/(C)/(A)/(C), (B)/(A)/(C)/(B)/(C), (B)/(A)/(B)/(C)/(B), (B)/(C)/(A)/(B)/(C), (B)/(C)/(A)/(C)/(B) and (B)/(C)/(B)/(A)/(C); and may have a pigment coated layer on the surface of the outermost layer. The layer (A), the layer (B), the layer (C), a method for preparing the stretched resin film and the pigment coated layer are described below.

Layer (A)

The layer (A) of the stretched resin film of the present invention comprises 0 to 98 wt % of a polyolefinic resin, 2 wt % or more and less than 100 wt % of an amorphous resin and more than 0 wt % and 70 wt % or less of an inorganic finepowder and/or an organic filler.

Polyolefinic resins used in the layer (A) are not particularly limited. Examples of the polyolefinic resins used in the layer (A) include a homopolymer of $C_{2-8}$ α-olefins such as ethylene, propylene, 1-butene, 1-hexene, 1-heptene, 1-octene, 4-methyl-1-pentene and 3-methyl-1-pentene; and copolymers of 2 to 5 kinds of such α-olefins. The copolymers may be in the form of either a random copolymer or block copolymer. More specifically, the polyolefinic resin may be an ethylene-based resin such as a branched or normal polyethylene having a density of 0.89 to 0.97 $g/cm^3$ and a melt flow rate (190° C., 2.16 kg load) of 0.2 to 20 g/10 minutes; and a propylene-based resin such as polymers having a melt flow rate (230° C., 2.16 kg load) of 0.2 to 20 g/10 minutes that include, for example, a propylene homopolymer, a (4-methyl-1-pentene) homopolymer, a propylene-ethylene copolymer, a propylene-(1-butene) copolymer, a propylene-ethylene-(1-butene) copolymer, a propylene-(4-methyl-1-pentene) copolymer, a propylene-(3-methyl-1-pentene) copolymer, poly(1-butene), poly(4-methyl-1-pentene) and propylene-ethylene-(3-methyl-1-pentene) copolymer. Propylene homopolymer, propylene-ethylene random copolymer and high-density polyethylene are preferred because they are inexpensive and easily processed.

The polyolefinic resin used for the layer (A) preferably has a melting point (i.e., peak temperature in a DSC curve)

of 130 to 210° C. In particular, propylene homopolymer having a melting point (peak temperature in a DSC curve) of 155 to 174° C., a melt flow rate (JIS K-7210, herein incorporated by reference) of 0.5 to 15 g/10 minutes and a crystallinity of 45 to 70% is preferable. High-density polyethylene having a melting point (peak temperature in a DSC curve) of 120 to 135° C., a melt flow rate (JIS K-6760, herein incorporated by reference) of 0.5 to 10 g/10 minutes, a crystallinity of 65 to 95% and a density of 0.945 g/cm³ or more is also preferable. The base layer (A) may be comprised of a single type of polyolefinic resin, or may be a mixture of two or more polyolefinic resins, selected from the polyolefinic resins described above.

The amorphous resin used in the layer (A) preferably has a glass transition temperature of 140° C. or below, and more preferably 70 to 140° C. If the glass transition temperature of the amorphous resin is lower than 70° C., the resulting film tends to adhere to processing rolls when processing, and thus is difficult to form into films. If the glass transition temperature of the amorphous resin is higher than 140° C., the film tends to reduce the ability to resist the solvent attack. If the layer (A) comprises less than 2 wt % of the amorphous resin, surface is damaged by viscous ink in printing and a part of a surface of the resultant printed matter is picked by the ink (picking).

The amorphous resin may be, for example, a cyclic olefin resin. The layer (A) may include a single type of amorphous resin, or a combination of two or more such amorphous resins.

The cyclic olefin resin may be, for example, a resin selected from the group consisting of ring-opened polymers derived from a cyclic olefin monomer having the formula (1) below; hydrogenated ring-opened polymers or copolymers of cyclic olefin monomers having the formula (1) below; and copolymers of ethylene and a cyclic olefin monomer having the formula (1):

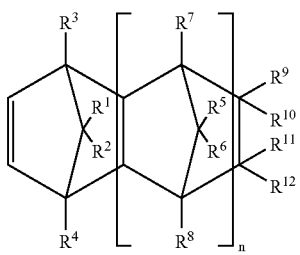

(1)

where, "n" denotes 0 or a positive integer, $R^1$ to $R^{12}$ independently represents an atom or a functional group selected from the group consisting of a hydrogen atom, a halogen atom and hydrocarbon groups, $R^9$ to $R^{12}$ may be bound with each other to form a monocyclic or polycyclic group, where such monocyclic or polycyclic groups may have a double bond, and $R^9$ and $R^{10}$, or $R^{11}$ and $R^{12}$ together may form an alkylidene group.

Such cyclic olefin monomers may include known monomers disclosed, for example, in Japanese Unexamined Patent Publication (KOKAI) Nos. 2-227424, 2-276842, 5-97719, 7-41550 and 8-72210, herein incorporated by reference. Specific examples of such cyclic olefin monomers include:
bicyclo[2.2.1]hept-2-ene derivatives,
tetracyclo[4.4.0.1$^{2,5}$.1$^{7,10}$]-3-dodecene derivatives,
hexacyclo[6.6.1.1$^{3,6}$.1$^{10,13}$.0$^{2,7}$.0$^{9,14}$]-4-heptadecene derivatives,
octacyclo[8.8.0.1$^{2,9}$.1$^{4,7}$.1$^{11,18}$.1$^{13,16}$.0$^{3,8}$.0$^{12,17}$]-5-docosene derivatives,
pentacyclo[6.6.1.1$^{3,6}$.0$^{2,7}$.0$^{9,14}$]-4-hexadecene derivatives,
heptacyclo-5-eicosene derivative,
heptacyclo-5-heneicosene derivatives,
tricyclo[4.3.0.1$^{2,5}$]-3-decene derivatives,
tricyclo[4.4.0.1$^{2,5}$]-3-undecene derivaives,
pentacyclo[6.5.1.1$^{3,6}$.0$^{2,7}$.0$^{9,13}$]-4-pentadecene derivatives,
pentacyclopentadecadiene derivatives,
pentacyclo[7.4.0.1$^{2,5}$.1$^{9,12}$.0$^{8,13}$]-3-pentadecene derivatives,
heptacyclo[8.7.0.1$^{3,6}$.1$^{10,17}$.1$^{12,15}$.0$^{2,7}$.0$^{11,16}$]-4-eicosene derivatives,
nonacyclo[10.9.1.1$^{4,7}$.1$^{13,20}$.1$^{15,18}$.0$^{3,8}$.0$^{2,10}$.0$^{12,21}$.0$^{14,19}$]-5-pentacosene derivatives,
pentacyclo[8.4.0.1$^{2,5}$.1$^{9,12}$.0$^{8,13}$]-3-hexadecene derivatives,
heptacyclo[8.8.0.1$^{4,7}$.1$^{11,18}$.1$^{13,16}$.0$^{3,8}$.0$^{12,17}$]-5-heneicosene derivatives,
nonacyclo[10.10.1.1$^{5,8}$.1$^{14,21}$.1$^{16,19}$.0$^{2,11}$.0$^{4,9}$.0$^{13,22}$.0$^{15,20}$]-5-hexacosene derivatives,
1,4-methano-1,4,4a,9a-teterahydrofluorene derivatives,
1,4-methano-1,4,4a,5,10,10a-hexahydroanthracene derivatives, and
cyclopentadiene-acenaphthylene adduct.

More specifically, examples of such monomers may include:
bicyclo[2.2.1]hept-2-ene derivatives such as
bicyclo[2.2.1]hept-2-ene,
6-methylbicyclo[2.2.1]hept-2-ene,
5,6-dimethylbicyclo[2.2.1]hept-2-ene,
1-methylbicyclo[2.2.1]hept-2-ene, 6-ethylbicyclo[2.2.1]hept-2-ene,
6-n-butylbicyclo[2.2.1]hept-2-ene, 6-isobutylbicyclo[2.2.1]hept-2-ene and
7-methylbicyclo[2.2.1]hept-2-ene;
tetracyclo[4.4.0.1$^{2,5}$.1$^{7,10}$]-3-dodecene derivatives such as
tetracyclo[4.4.0.1$^{2,5}$.1$^{7,10}$]-3-dodecene,
8-methyltetracyclo[4.4.0.1$^{2,5}$.1$^{7,10}$]-3-dodecene,
8-ethyltetracyclo[4.4.0.1$^{2,5}$.1$^{7,10}$]-3-dodecene,
8-propyltetracyclo[4.4.0.1$^{2,5}$.1$^{7,10}$]-3-dodecene,
8-butyltetracyclo[4.4.0.1$^{2,5}$.1$^{7,10}$]-3-dodecene,
8-isobutyltetracyclo[4.4.0.1$^{2,5}$.1$^{7,10}$]-3-dodecene,
8-hexyltetracyclo[4.4.0.1$^{2,5}$.1$^{7,10}$]-3-dodecene,
8-cyclohexyltetracyclo[4.4.0.1$^{2,5}$.1$^{7,10}$]-3-dodecene,
8-stearyltetracyclo[4.4.0.1$^{2,5}$.1$^{7,10}$]-3-dodecene,
5,10-dimethyltetracyclo[4.4.0.1$^{2,5}$.1$^{7,10}$]-3-dodecene,
2,10-dimethyltetracyclo[4.4.0.1$^{2,5}$.1$^{7,10}$]-3-dodecene,
8,9-dimethyltetracyclo[4.4.0.1$^{2,5}$.1$^{7,10}$]-3-dodecene,
8-ethyl-9-methyltetracyclo[4.4.0.1$^{2,5}$.1$^{7,10}$]-3-dodecene,
11,12-dimethyltetracyclo[4.4.0.1$^{2,5}$.1$^{7,10}$]-3-dodecene,
2,7,9-trimethyltetracyclo[4.4.0.1$^{2,5}$.1$^{7,10}$]-3-dodecene,
9-ethyl-2,7-dimethyltetracyclo[4.4.0.1$^{2,5}$.1$^{7,10}$]-3-dodecene,
9-isobutyl-2,7-dimethyltetracyclo[4.4.0.1$^{2,5}$.1$^{7,10}$]-3-dodecene,
9,11,12-trimethyltetracyclo[4.4.0.1$^{2,5}$.1$^{7,10}$]-3-dodecene,
9-ethyl-11,12-dimethyltetracyclo[4.4.0.1$^{2,5}$.1$^{7,10}$]-3-dodecene,
9-isobutyl-11,12-dimethyltetracyclo[4.4.0.1$^{2,5}$.1$^{7,10}$]-3-dodecene,
5,8,9,10-tetramethyltetracyclo[4.4.0.1$^{2,5}$.1$^{7,10}$]-3-dodecene,
8-ethylidene-9-methyltetracyclo[4.4.0.1$^{2,5}$.1$^{7,10}$]-3-dodecene,
8-ethylidene-9-ethyltetracyclo[4.4.0.1$^{2,5}$.1$^{7,10}$]-3-dodecene,
8-ethylidene-9-isopropyltetracyclo[4.4.0.1$^{2,5}$.1$^{7,10}$]-3-dodecene,
8-ethylidene-9-butyltetracyclo[4.4.0.1$^{2,5}$.1$^{7,10}$]-3-dodecene, 8-n-propylidenetetracyclo[4.4.0.1$^{2,5}$.1$^{7,10}$]-3-dodecene,
8-n-propylidene-9-methyltetracyclo[4.4.0.1$^{2,5}$.1$^{7,10}$]-3-dodecene,
8-n-propylidene-9-ethyltetracyclo[4.4.0.1$^{2,5}$.1$^{7,10}$]-3-dodecene,
8-n-propylidene-9-isopropyltetracyclo[4.4.0.1$^{2,5}$.1$^{7,10}$]-3-dodecene,
8-n-propylidene-9-butyltetracyclo[4.4.0.1$^{2,5}$.1$^{7,10}$]-3-dodecene,
8-isopropylidenetetracyclo[4.4.0.1$^{2,5}$.1$^{7,10}$]-3-dodecene,
8-isopropylidene-9-methyltetracyclo[4.4.0.1$^{2,5}$.1$^{7,10}$]-3-dodecene,
8-isopropylidene-9-ethyltetracyclo[4.4.0.1$^{2,5}$.1$^{7,10}$]-3-dodecene,
8-isopropylidene-9-isopropyltetracyclo[4.4.0.1$^{2,5}$.1$^{7,10}$]-3-dodecene,
8-isopropylidene-9-butyltetracyclo[4.4.0.1$^{2,5}$.1$^{7,10}$]-3-dodecene,
8-chlorotetracyclo[4.4.0.1$^{2,5}$.1$^{7,10}$]-3-dodecene,
8-bromotetracyclo[4.4.0.1$^{2,5}$.1$^{7,10}$]-3-dodecene,
8-fluorotetracyclo[4.4.0.1$^{2,5}$.1$^{7,10}$]-3-dodecene, and
8,9-dichlorotetracyclo[4.4.0.1$^{2,5}$.1$^{7,10}$]-3-dodecene;
hexacyclo[6.6.1.1$^{3,6}$.1$^{10,13}$.0$^{2,7}$.0$^{9,14}$]-4-heptadecene derivatives such as
hexacyclo[6.6.1.1$^{3,6}$.1$^{10,13}$.0$^{2,7}$.0$^{9,14}$]-4-heptadecene,
12-methylhexacyclo[6.6.1.1$^{3,6}$.1$^{10,13}$.0$^{2,7}$.0$^{9,14}$]-4-heptadecene,
12-ethylhexacyclo[6.6.1.1$^{3,6}$.1$^{10,13}$.0$^{2,7}$.0$^{9,14}$]-4-heptadecene,
12-isobutylhexacyclo[6.6.1.1$^{3,6}$.1$^{10,13}$.0$^{2,7}$.0$^{9,14}$]-4-heptadecene,
1,6,10-trimethyl-12-isobutylhexacyclo[6.6.1.1$^{3,6}$.1$^{10,13}$.0$^{2,7}$.0$^{9,14}$]-4-hepta-decene;
octacyclo[8.8.0.1$^{2,9}$.1$^{4,7}$.1$^{11,18}$.1$^{13,16}$.0$^{3,8}$.0$^{12,17}$]-5-docosene derivatives such as
octacyclo[8.8.0.1$^{2,9}$.1$^{4,7}$.1$^{11,18}$.1$^{13,16}$.0$^{3,8}$.0$^{12,17}$]-5-docosene,
15-methyloctacyclo[8.8.0.1$^{2,9}$.1$^{4,7}$.1$^{11,18}$.1$^{13,16}$.0$^{3,8}$.0$^{12,17}$]-5-docoscene, and
15-ethyloctacyclo[8.8.0.1$^{2,9}$.1$^{4,7}$.1$^{11,18}$.1$^{13,16}$.0$^{3,8}$.0$^{12,17}$]-5-docosene;
pentacyclo[6.6.1.1$^{3,6}$.0$^{2,7}$.0$^{9,14}$]-4-hexadecene derivatives such as
pentacyclo[6.6.1.1$^{3,6}$.0$^{2,7}$.0$^{9,14}$]-4-hexadecene,
1,3-dimethylpentacyclo[6.6.1.1$^{3,6}$.0$^{2,7}$.0$^{9,14}$]-4-hexadecene,
1,6-dimethylpentacyclo[6.6.1.1$^{3,6}$.0$^{2,7}$.0$^{9,14}$]-4-hexadecene and
15,16-dimethylpentacyclo[6.6.1.1$^{3,6}$.0$^{2,7}$.0$^{9,14}$]-4-hexa-decene;

heptacyclo-5-eicosene derivatives or heptacyclo-5-heneicosene derivatives such as
heptacyclo[8.7.0.1$^{2,9}$.1$^{4,7}$.1$^{11,17}$.0$^{3,8}$.0$^{12,16}$]-5-eicosene and
heptacyclo[8.8.0.1$^{2,9}$.1$^{4,7}$.1$^{11,18}$.0$^{3,8}$.0$^{12,17}$]-5-heneicosene;
tricyclo[4.3.0.1$^{2,5}$]-3-decene derivatives such as
tricyclo[4.3.0.1$^{2,5}$]-3-decene, 2-methyltricyclo[4.3.0.1$^{2,5}$]-3-decene and
5-methyltricyclo[4.3.0.1$^{2,5}$]-3-decene;
tricyclo[4.4.0.1$^{2,5}$]-3-undecene derivatives such as
tricyclo[4.4.0.1$^{2,5}$]-3-undecene and
10-methyltricyclo[4.4.0.1$^{2,5}$]-3-undecene;
pentacyclo[6.5.1.1$^{3,6}$.0$^{2,7}$.0$^{9,13}$]-4-pentadecene derivatives such as
pentacyclo[6.5.1.1$^{3,6}$.0$^{2,7}$.0$^{9,13}$]-4-pentadecene,
1,3-dimethylpentacyclo[6.5.1.1$^{3,6}$.0$^{2,7}$.0$^{9,13}$]-4-penta-decene,
1,6-dimethylpentacyclo[6.5.1.1$^{3,6}$.0$^{2,7}$.0$^{9,13}$]-4-pentadecene and
14,15-dimethylpentacyclo[6.5.1.1$^{3,6}$.0$^{2,7}$.0$^{9,13}$]-4-pentadecene;
diene compounds such as
pentacyclo[6.5.1.1$^{3,6}$.0$^{2,7}$.0$^{9,13}$]-4,10-pentadecadiene;
pentacyclo[7.4.0.1$^{2,5}$.1$^{9,12}$.0$^{8,13}$]-3-pentadecene derivatives such as
pentacyclo[7.4.0.1$^{2,5}$.1$^{9,12}$.0$^{8,13}$]-3-pentadecene and
methyl-substituted pentacyclo[7.4.0.1$^{2,5}$.1$^{9,12}$.0$^{8,13}$]-3-pentadecene;
heptacyclo[8.7.0.1$^{3,6}$.1$^{10,17}$.1$^{12,15}$.0$^{2,7}$.0$^{11,16}$]-4-eicosene derivatives such as
heptacyclo[8.7.0.1$^{3,6}$.1$^{10,17}$.1$^{12,15}$.0$^{2,7}$.0$^{11,16}$]-4-eicosene and
dimethyl-substituted heptacyclo[8.7.0.1$^{3,6}$.1$^{10,17}$.1$^{12,15}$.0$^{2,7}$.0$^{11,16}$]-4-eicosene;
nonacyclo[10.9.1.1$^{4,7}$.1$^{13,20}$.1$^{15,18}$.0$^{3,8}$.0$^{2,10}$.0$^{12,21}$.0$^{14,19}$]-5-pentacosene derivatives such as
nonacyclo[10.9.1.1$^{4,7}$.1$^{13,20}$.1$^{15,18}$.0$^{3,8}$.0$^{2,10}$.0$^{12,21}$.0$^{14,19}$]-5-pentacosene and trimethyl-substituted
nonacyclo[10.9.1.1$^{4,7}$.1$^{13,20}$.1$^{15,18}$.0$^{3,8}$.0$^{2,10}$.0$^{12,21}$.0$^{14,19}$]-5-pentacosene;
pentacyclo[8.4.0.1$^{2,5}$.1$^{9,12}$.0$^{8,13}$]-3-hexadecene derivatives such as
pentacyclo[8.4.0.1$^{2,5}$.1$^{9,12}$.0$^{8,13}$]-3-hexadecene,
11-methylpentacyclo[8.4.0.1$^{2,5}$.1$^{9,12}$.0$^{8,13}$]-3-hexadecene,
11-ethylpentacyclo[8.4.0.1$^{2,5}$.1$^{9,12}$.0$^{8,13}$]-3-hexadecene and
10,11-dimethylpentacyclo[8.4.0.1$^{2,5}$.1$^{9,12}$.0$^{8,13}$]-5-hexa-decene;
heptacyclo[8.8.0.1$^{4,7}$.1$^{11,18}$.1$^{13,16}$.0$^{3,8}$.0$^{12,17}$]-5-heneicosene derivatives such as
heptacyclo[8.8.0.1$^{4,7}$.1$^{11,18}$.1$^{13,16}$.0$^{3,8}$.0$^{12,17}$]-5-heneicosene,
15-methylheptacyclo[8.8.0.1$^{4,7}$.1$^{11,18}$.1$^{13,16}$.0$^{3,8}$.0$^{12,17}$]-5-heneicosene an
trimethylheptacyclo[8.8.0.1$^{4,7}$.1$^{11,18}$.1$^{13,16}$.0$^{3,8}$.0$^{12,17}$]-5-heneicosene;
nonacyclo[10.10.1.1$^{5,8}$.1$^{14,21}$.1$^{16,19}$.0$^{2,11}$.0$^{4,9}$.0$^{13,22}$.0$^{15,20}$]-6-hexacosene derivative such as
nonacyclo[10.10.1.1$^{5,8}$.1$^{14,21}$.1$^{16,19}$.0$^{2,11}$.0$^{4,9}$.0$^{13,22}$.015,20]-6-hexacosene;
pentacyclo[6.5.1.1$^{3,6}$.0$^{2,7}$.0$^{9,13}$]-4,11-pentadecadiene,
methyl-substituted pentacyclo[6.5.1.1$^{3,6}$.0$^{2,7}$.0$^{9,13}$]-4,11-pentadecadiene,
trimethyl-substituted pentacyclo[4.7.0.1$^{2,5}$.0$^{8,13}$.1$^{9,12}$]-3-pentadecene,
pentacyclo[4.7.0.1$^{2,5}$.0$^{8,13}$.1$^{9,12}$]-3,10-pentadecadiene,
methyl-substituted pentacyclo[4.7.0.1$^{2,5}$.0$^{8,13}$.1$^{9,12}$]-3,10-pentadecadiene,
methyl-substituted heptacyclo[7.8.0.1$^{3,6}$.0$^{2,7}$.1$^{10,17}$.0$^{11,16}$.1$^{12,15}$]-4-eicosene,
trimethyl-substituted heptacyclo[7.8.0.1$^{3,6}$.0$^{2,7}$.1$^{10,17}$.0$^{11,16}$.1$^{12,15}$]-4-eico-sene,
tetramethyl-substituted heptacyclo[7.8.0.1$^{3,6}$.0$^{2,7}$.1$^{10,17}$.0$^{11,16}$.1$^{12,15}$]-4-eico-sene,
tricyclo[4.3.0.1$^{2,5}$]-3,7-decadiene (i.e., dicyclopentadiene),
2,3-dihydrodicyclopentadiene,
5-phenylbicyclo[2.2.1]hept-2-ene (i.e., 5-phenyl-2-norbornen),
5-methyl-5-phenylbicyclo[2.2.1]hept-2-ene,
5-benzylbicyclo[2.2.1]hept-2-ene,
5-tolylbicyclo[2.2.1]hept-2-ene,
5-(ethylphenyl)-bicyclo[2.2.1]hept-2-ene,
5-(isopropylphenyl)-bicyclo[2.2.1]hept-2-ene,
8-phenyltetracyclo[4.4.0.1$^{2,5}$.1$^{7,10}$]-3-dodecene, 8-methyl-8-phenyltetracyclo[4.4.0.1$^{2,5}$.1$^{7,10}$]-3-dodecene,
8-benzyltetracyclo[4.4.0.1$^{2,5}$.1$^{7,10}$]-3-dodecene,
8-tolyltetracyclo[4.4.0.1$^{2,5}$.1$^{7,10}$]-3-dodecene,
8-(ethylphenyl)-tetracyclo[4.4.0.1$^{2,5}$.1$^{7,10}$]-3-dodecene,
8-(isopropylphenyl)-tetracyclo[4.4.0.1$^{2,5}$.1$^{7,10}$]-3-dodecene,
8,9-diphenyltetracyclo[4.4.0.1$^{2,5}$.1$^{7,10}$]-3-dodecene,
8-(biphenyl)-tetracyclo[4.4.0.1$^{2,5}$.1$^{7,10}$]-3-dodecene,
8-(βnaphthyl)-tetracyclo[4.4.0.1$^{2,5}$.1$^{7,10}$]-3-dodecene,
8-(α-naphthyl)-tetracyclo[4.4.0.1$^{2,5}$.1$^{7,10}$]-3-dodecene,
8-(anthracenyl)-tetracyclo[4.4.0.1$^{2,5}$.1$^{7,10}$]-3-dodecene,
11-phenylhexacyclo[6.6.1.1$^{3,6}$.0$^{2,7}$.0$^{9,14}$]-4-heptadecene,
6-(α-naphthyl)-bicyclo[2.2.1]-hept-2-ene,
5-(anthracenyl)-bicyclo[2.2.1]-hept-2-ene,
5-(biphenyl)-bicyclo[2.2.1]-hept-2-ene,
5-(β-naphthyl)-bicyclo[2.2.1]-hept-2-ene,
5,6-diphenylbicyclo[2.2.1]-hept-2-ene,
9-(2-norbornen-5-yl)-carbazole and
1,4-methano-1,4,4a,4b,5,8,8a,9a-octahydrofluorene compounds;
1,4-methano-1,4,4a,9a-tetrahydrofluorene compounds such as
1,4-methano-1,4,4a,9a-tetrahydrofluorene,
1,4-methano-8-methyl-1,4,4a,9a-tetrahydrofluorene,
1,4-methano-8-chloro-1,4,4a,9a-tetrahydrofluorene and
1,4-methano-8-bromo-1,4,4a,9a-tetrahydrofluorene;
1,4-methano-1,4,4a,9a-tetrahydrodibenzofuran compounds;
1,4-methano-1,4,4a,9a-tetrahydrocarbazole compounds such as
1,4-methano-1,4,4a,9a-tetrahydrocarbazole and
1,4-methano-9-phenyl-1,4,4a,9a-tetrahydrocarbazole;
1,4-methano-1,4,4a,5,10,10a-hexahydroanthracene compounds such as
1,4-methano-1,4,4a,5,10,10a-hexahydroanthracene;
7,10-methano-6b,7,10,10a-tetrahydrofluoranthene compounds;
cyclopentadiene-acenaphthylene adduct further reacted with cyclopenta-diene,
11,12-benzo-pentacyclo[6.5.1.1$^{3,6}$.0$^{2,7}$.0$^{9,13}$]-4-pentadecene,
11,12-benzo-pentacyclo[6.6.1.1$^{3,6}$.0$^{2,7}$.0$^{9,14}$]-4-hexadecene,
14,15-benzo-heptacyclo[8.7.0.1$^{2,9}$.1$^{4,7}$.1$^{11,17}$.0$^{3,8}$.0$^{12,16}$]-5-eicosene and
cyclopentadiene-acenaphthylene adduct. These cyclic olefin monomers may homopolymerized or copolymerized with one or more different cyclic olefin monomer listed above.

The hydrogenated ring-opened polymers or copolymers of the cycloolefin monomer may be prepared by the methods described, for example, in Japanese Unexamined Patent Publication (KOKAI) Nos. 60-26024, 63-218727 and 63-23201, herein incorporated by reference. In these methods, for example, the cycloolefin monomer is typically polymerized in the presence of a polymerization catalyst comprising a metal compound, and then the resulting polymer is hydrogenated by well-known methods. Such hydrogenation methods typically include hydrogenating the polymer in the presence of a catalyst generally used for hydrogenation of olefin compounds.

The random copolymer of cyclic olefin monomers with ethylene may be prepared, for example, by the method described in Japanese Unexamined Patent Publication (KOKAI) No. 60-168708, herein incorporated by reference, in which the polymerization is carried out in the presence of a catalyst comprising a vanadium compound and a halogen-containing, organo-aluminum compound. The molar fraction of ethylene is preferably 40 to 90%.

The inorganic finepowder used for the layer (A) preferably has an average particle size of 0.01 to 6 micrometers, more preferably 0.05 to 4 micrometers, and still more preferably 0.07 to 2 micrometers. The organic filler used for the layer (A) preferably has an average dispersion particle size of 0.01 to 6 micrometers, more preferably 0.05 to 4 micrometers, and still more preferably 0.07 to 2 micrometers.

Examples of the inorganic finepowder include heavy calcium carbonate, precipitated calcium carbonate, calcined clay, talc, titanium dioxide, barium sulfate, aluminum sulfate, silica, zinc oxide, magnesium oxide and diatom earth. Surface modified products of the above inorganic finepowders using various surface modifiers are also exemplified. Among these, heavy calcium carbonate, precipitated calcium carbonate, talc, surface modified products thereof, clay and diatom earth are preferable in terms of inexpensiveness and void forming property in the stretching. Still more preferable are surface modified products of heavy calcium carbonate and precipitated calcium carbonate using various surface modifiers. Examples of the surface modifiers include resin acid, aliphatic acid, organic acid, sulfate ester type anionic surfactant, sulfonate type anionic surfactant, petroleum resin acid, and sodium, potassium or ammonium salts thereof, or aliphatic esters or resinate esters thereof, wax and paraffin. It is also preferable to use nonionic surfactant, diene-base polymer, titanate coupling agents, silane coupling agents and phosphate coupling agents. Examples of the sulfate-ester-type anionic surfactant include long-chain alcohol sulfate ester, polyoxyethylenealkylether sulfate ester, sulfated oil, and sodium or potassium salts thereof; examples of the sulfonate-type anionic surfactant include alkylbenzenesulfonic acid, alkylnaphthalenesulfonic acid, paraffinsulfonic acid, α-olefinsulfonic acid, alkylsulfosuccinic acid, and sodium or potassium salts thereof Examples of the aliphatic acid include caproic acid, caprylic acid, pelargonic acid, capric acid, undecanoic acid, lauric acid, myristic acid, palmitic acid, stearic acid, behenic acid, oleic acid, linoleic acid, linolenic acid and eleostearic acid; examples of the organic acid include maleic acid and sorbic acid; examples of diene-base polymer include polybutadiene and isoprene; examples of nonionic surfactant include polyethyleneglycol ester type surfactant. These surface modifiers may be used individually or in any combinations of two or more thereof.

The organic filler is exemplified by polyethylene terephthalate, polybutylene terephthalate, polyamide, polycarbonate, polyethylene naphthalate, melamine resin, polyethylene sulfite, polyimide, polyethyl ether ketone and polyphenylene sulfite. Among these, incompatible organic fillers having a higher melting point or glass transition point than that of the polyolefinic resin to be combined therewith are preferable in terms of void formation.

For the layer (A), a single species of the inorganic finepowder or the organic filler may be selected from the above for independent use, or two or more species may be selected therefrom for combined use. The case of combined use of two or more species allows mixed use of the organic filler and the inorganic finepowder.

The thickness of the layer (A) is preferably 2 to 600 micrometers, more preferably 3 to 400 micrometers, and still more preferably 4 to 300 micrometers.

The layer (A) comprises 0 to 98 wt % of a polyolefinic resin, 2 wt % or more and less than 100 wt % of an amorphous resin and more than 0 wt % and 70 wt % or less of an inorganic finepowder and/or an organic filler.

If paper texture is required in the stretched resin film, it preferably has an opacity (measured in compliance with JIS P-8138) of 70% or above. A stretched resin film having such opacity comprises 0 to 75 wt % of a polyolefinic resin, 2 to 85 wt % of an amorphous resin and 10 to 70 wt % of an inorganic finepowder and/or an organic filler; preferably 10 to 70 wt % of a polyolefinic resin, 3 to 80 wt % of an amorphous resin and 10 to 65 wt % of an inorganic finepowder and/or an organic filler; more preferably 20 to 60 wt % of a polyolefinic resin, 5 to 55 wt % of an amorphous resin and 15 to 60 wt % of an inorganic finepowder and/or an organic filler. If transparency is required in the stretched resin film, it preferably has an opacity (measured in compliance with JIS P-8138) of less than 70%. A stretched resin film having such opacity comprises 0 to 90 wt % of a polyolefinic resin, 10 wt % or more and less than 100 wt % of an amorphous resin and more than 0 wt % and less than 10 wt % of an inorganic finepowder and/or an organic filler; preferably 0 to 79 wt % of a polyolefinic resin, 20 to 99 wt % of an amorphous resin and 1 to 8 wt % of an inorganic finepowder and/or an organic filler; more preferably 20 to 78 wt % of a polyolefinic resin, 20 to 78 wt % of an amorphous resin and 2 to 6 wt % of an inorganic finepowder and/or an organic filler.

The layer (A) is essentially stretched in at least one axial direction. The porosity of the layer (A) which is controlled by the inorganic finepowders and/or the organic fillers is preferably more than 5%. If opacity is required in the stretched resin film, the porosity is preferably 10 to 55%, more preferably 15 to 50%, still more preferably 20 to 45%. If transparency is required in the stretched resin film, the porosity is preferably more than 5% and less than 10%, more preferably 5.5 to 9%, still more preferably 6 to 8%. The porosity of the layer (A) is determined by observing a cross-section of the stretched resin film under a scanning electron microscope, and then estimating the ratio of the area of the voids to the total area of the layer (A). Voids are formed by stretching and the film may be stretched uniaxially or biaxially. If the stretched resin film of the present invention is produced by stretching, the stretching temperature is preferably 10° C. or more higher than the glass transition temperature of the amorphous resin. If the film is stretched 16-fold or more in area magnification [(magnification in the longitudinal direction) x (magnification in the transverse direction)], an amorphous resin is contained in an amount of 100 parts by weight or less on the basis of 100 parts by weight of a polyolefinic resin.

Although the inventors do not adhere to any scientific theory, they think that incorporation of the amorphous resin contained in the layer (A) inhibits swelling in the layer (A) with vehicle in an offset ink, particularly high-boiling-point, petroleum-base solvent such as mineral oil whereby the stretched resin film per se is resistant to swelling and becoming waved. Accordingly, widely-used, quick-drying offset printing inks (drying oil type) can be applied to the stretched resin film of the present invention.

Layer (B)

In the stretched resin film of the present invention, a layer (B) comprising 30 to 100 wt % of a polyolefinic resin and 0 to 70 wt % of an inorganic finepowder and/or an organic filler is formed on at least one surface of the layer (A).

The polyolefinic resin used for the layer (B) is not particularly limited. Examples of the polyolefinic resin include those listed in the above for the layer (A). Propylene homopolymer; ethylene-propylene random copolymer, high-density polyethylene and a mixture thereof are preferably used. Among them, propylene homopolymer having a melting point (peak temperature in a DSC curve) of 155 to 174° C., a melt flow rate (JIS K-7210) of 0.5 to 20 g/10 minutes and a crystallinity of 45 to 70% is preferable. High-density polyethylene having a melting point (peak temperature in a DSC curve) of 120 to 135° C. a melt flow rate (JIS K-6760) of 0.2 to 20 g/10 minutes, a crystallinity of 65 to 95% and a density of 0.945 g/cm$^3$ or more is also preferable. For the layer (B), a single species may be selected from the above polyolefinic resins for independent use, or two or more species may be selected therefrom for combined use.

The inorganic finepowder used for the layer (B) preferably has an average particle size of 0.01 to 10 micrometers, and more preferably 0.05 to 8 micrometers. The organic filler used for the layer (B) preferably has an average dispersion particle size of 0.01 to 10 micrometers, and more preferably 0.05 to 8 micrometers.

Examples of the inorganic finepowder include those listed in the above for the layer (A). Preferable inorganic finepowders are heavy calcium carbonate, precipitated calcium carbonate, talc, surface modified products thereof, clay and diatom earth. More preferable inorganic finepowders are surface modified products of heavy calcium carbonate and precipitated calcium carbonate by various surface modifier.

The organic filler is exemplified by polyethylene terephthalate, polybutylene terephthalate, polyamide, polycarbonate, polyethylene naphthalate, melamine resin, cyclic olefin copolymer, polyethylene sulfite, polyimide, polyethyl ether ketone and polyphenylene sulfite. Among these, incompatible organic fillers having a higher melting point than that of the polyolefinic resin to be combined therewith are preferable.

For the layer (B), a single species of the inorganic finepowder or the organic filler may be selected from the above for independent use, or two or more species may be selected therefrom for combined use. The case of combined use of two or more species allows mixed use of the organic filler and the inorganic finepowder.

The layer (B) may comprise 30 to 100 wt % of the polyolefinic resin and 0 to 70 wt % of the inorganic finepowder and/or organic filler. If opaqueness is required in the stretched resin film, the layer (B) preferably comprises 30 to 90 wt % of the polyolefinic resin and 10 to 70 wt % of the inorganic finepowder and/or organic filler, and more preferably comprises 45 to 89 wt % of the polyolefinic resin and 11 to 55 wt % of the inorganic finepowder and/or organic filler. If transparency is required in the stretched resin film, the layer (B) preferably more than 90 wt % and 100 wt % or less of the polyolefinic resin and more than 0 wt % and less than 10 wt % of the inorganic finepowder and/or organic filler, and more preferably comprises 92 to 99.5 wt % of the polyolefinic resin and 0.5 to 8 wt % of the inorganic finepowder and/or organic filler, and still more preferably comprises 94 to 99 wt % of the polyolefinic resin and 1 to 6 wt % of the inorganic finepowder and/or organic filler.

The layer (B) is preferably stretched in at least one axial direction. The layer (B) may contain voids during the stretching and porosity of the layer (B) is preferably 0 to 55%. If opaqueness is required in the stretched resin film, porosity is preferably 10 to 55%. If transparency is required in the stretched resin film, porosity is preferably 0 to 9%. The porosity of the layer (B) is determined by observing a cross-section of the stretched resin film under a scanning electron microscope, and then estimating the ratio of the area of the voids to the total area of the layer (B). Voids are formed by stretching and the film may be stretched uniaxially or biaxially.

The thickness of the layer (B) is preferably 0.5 to 400 micrometers, and is more preferably 1 to 300 micrometers.

The layer (B) may have a multilayer structure consisting of two or more layers.

Layer (C)

The stretched resin film of the present invention has a layer (C) comprising 0 to 85 wt % of a polyolefinic resin and 15 to 100 wt % of an amorphous resin on at least one surface of the layer (A) or the layer (B) and preferably comprises a layer structure selected from (A)/(C)/(B), (A)/(C)/(B)/(A), (A)/(C)/(B)/(C) and (A)/(C)/(B)/(C)/(A).

The polyolefinic resin used for the layer (C) is not particularly limited. Examples of the polyolefinic resin include those listed in the above for the layer (A). Propylene homopolymer; ethylene-propylene random copolymer, high-density polyethylene and a mixture thereof are preferably used. Among them, propylene homopolymer having a melting point (peak temperature in a DSC curve) of 155 to 174° C. a melt flow rate (JIS K-7210) of 0.5 to 20 g/10 minutes and a crystallinity of 45 to 70% is preferable. High-density polyethylene having a melting point (peak temperature in a DSC curve) of 120 to 135° C. a melt flow rate (JIS K-6760) of 0.2 to 20 g/10 minutes, a crystallinity of 65 to 95% and a density of 0.945 g/cm$^3$ or more is also preferable. For the layer (C), a single species may be selected from the above polyolefinic resins for independent use, or two or more species may be selected therefrom for combined use.

Examples of the amorphous resin used for the layer (C) include those listed in the above for the layer (A) such as cycloolefinc resins. A single species may be selected from the amorphous resins for independent use, or two or more species may be selected therefrom for combined use.

The layer (C) comprises 0 to 85 wt % of a polyolefinic resin and 15 to 100 wt % of an amorphous resin. The layer (C) preferably comprises 20 to 80 wt % of a polyolefinic resin and 20 to 80 wt % of an amorphous resin. The layer (C) is preferably stretched in at least one axial direction. The thickness of the layer (C) is preferably 1 to 100 micrometers, and is more preferably 2 to 50 micrometers.

Preparation of Stretched Resin Film

Method for preparing the stretched resin film of the present invention is not particularly limited. Any films produced by any methods will be included within the scope of the present invention provided that they satisfy the conditions described in Claims. The following paragraphs deal with preferable methods for producing the stretched resin film of the present invention.

The stretched resin film of the present invention may be produced by first kneading a resin composition for the layer (A) or the layer (B) under conditions in which the components of the resin composition fuse, extruding the kneaded resin in a sheet form; stretching the sheet 4 to 7-fold in the longitudinal direction by means of the difference in the peripheral speeds of a number of roller groups; separately kneading resin compositions for the layer (A), the layer (B) and the layer (C) under conditions in which the components of these compositions fuse, then laminating sheets of the layers to form a desired structure [eg. (A)/(B), (B)/(A)/(B), (A)/(B)/(A), (A)/(C)/(B), (A)/(C)/(B)/(A), (A)/(C)/(B)/(C) or (A)/(C)/(B)/(C)/(A)]; stretching in the transverse direction the resulting laminate 4 to 12-fold using a tenter at a temperature 10° C. or more higher than the glass transition temperature of the amorphous resin; and then subjecting the resulting film to annealing and cooling.

Another process for preparing the stretched resin film of the present invention entails separately kneading resin compositions for the layer (A), the layer (B) and the layer (C) under conditions in which the components of these compositions fuse, then co-extruding these resin compositions for the respective layers in sheet form to form a desired layer structure [eg. (A), (A)/(B), (B)/(A)/(B), (A)/(B)/(A), (A)/(C)/(B), (A)/(C)/(B)/(A), (A)/(C)/(B)/(C) or (A)/(C)/(B)/(C)/(A)]; stretching the resulting sheet 4 to 7-fold in the longitudinal direction by means of the difference in the peripheral speeds of a number of roller groups, at a temperature 10° C. or more higher than the glass transition temperature of the amorphous resin; further stretching of the sheet 4 to 12-fold in the transverse direction using a tenter at a temperature 10° C. or more higher than the glass transition temperature of the amorphous resin; and then subjecting the resulting film to annealing and cooling.

A still another process for preparing the stretched resin film of the present invention entails separately kneading the resin compositions for the layer (A), the layer (B) and the layer (C) under conditions in which the components of these compositions fuse, then co-extruding these resin compositions for the respective layers in sheet form to form a desired layer structure [eg. (A), (A)/(B), (B)/(A)/(B), (A)/(B)/(A), (A)/(C)/(B), (A)/(C)/(B)/(A), (A)/(C)/(B)/(C) or (A)/(C)/(B)/(C)/(A)]; stretching the resulting sheet 1.2 to 12-fold, preferably 4 to 7-fold in the longitudinal direction by means of the difference in the peripheral speeds of a number of roller groups at a temperature 10° C. or more higher than the glass transition temperature of the amorphous resin; and then subjecting the resulting film to annealing and cooling.

The thickness of the stretched resin film is typically 30 to 800 micrometers.

The notation "(B)/(A)" in the present invention represents a film structure in which the layer (B) is disposed on one surface of the layer (A) and a third layer may be disposed between the layer (A) and the layer (B). The third layer can be determined based on purpose and function of the stretched resin film.

For example, it is preferable for enhancing paper-like texture of the stretched resin film to provide an intermediate layer (D) containing a polyolefinic resin and 2 to 55 wt % of an inorganic finepowder and/or an organic filler between the layer (A) and the layer (B). It is also preferable to add to such intermediate layer a small amount of a low-melting-point resin such as propylene-base copolymer, high-density polyethylene and ethylene-vinyl acetate copolymer for the purpose of improving the stretching property. Examples of the inorganic finepowders, the organic fillers and the polyolefinic resins used for the intermediate layer (D) are not limited and include those listed in the above for the layer (A).

In order to improve the offset printability, it is also allowable to modify the surface of the stretched resin film by corona discharge treatment, flame treatment or coating of a water-soluble primer selected from the group consisting of polyethyleneimine such as polyethyleneimine, butyl-substituted polyethyleneimine, hydroxypropyl-substituted polyethyleneimine, hydroxyethyl-substituted polyethyleneimine, 2,3-dihydroxypropyl-substituted polyethyleneimine, poly(ethyleneimine-urea); and ethyleneimine adducts such as polyamine polyamide; epichlorohydrin adducts such as polyamine polyamide; acrylic emulsion; and ternary or quaternary nitrogen-containing acrylic resin.

In order to further improve the offset printing properties of the stretched resin film of the present invention, a pigment coated layer may be provided on at least the outermost layer of the surface to be printed. Such a pigment coated layer may be formed by conventional pigment coating methods, for example those used to produce coated paper.

The pigment coating material may be, for example, a latex conventionally used for producing such coated layers, comprising 30 to 80 wt % of a pigment such as clay, talc, calcium carbonate, magnesium carbonate, aluminum hydroxide, silica, calcium silicate or plastic pigment, and 20 to 70 wt % of an adhesive.

Examples of the adhesive which may be used in the pigment coating material may include latices such as SBR (styrene-butadiene copolymeric rubber), MBR (methacrylate-butadiene copolymeric rubber); acrylic emulsions, starchs, PVA (polyvinyl alcohol), CMC (carboxymethyl cellulose) and methyl cellulose.

The pigment coating material may comprise a dispersion aid, for example those comprising a special sodium polycarboxylate such as acrylic acid/sodium acrylate copolymer, or a crosslinking agent such as polyamide-urea-base resin. The pigment coating material is generally in the form of a water-soluble coating agent having a solid content of 15 to 70 wt %, and more preferably 35 to 65 wt %.

The coating material may be coated onto the stretched resin film by methods such as gravure coating, Mayer bar coating, roll coating, blade coating or size press coating. The amount of coating applied is generally 0.01 to 20 g/m², and more preferably 0.1 to 15 g/m².

The present invention will be further described by the specific Examples, Comparative Examples and Test Examples herein. The materials used, the amount and ratio used, and the specific process steps and the like may be modified without departing from the spirit of the present invention. Thus, the present invention is by no means limited to the specific examples described below. Materials used in the examples and the comparative examples are shown in Table 2.

TABLE 2

Details of the Materials Employed

| Code | Material | Name | Contents |
|---|---|---|---|
| | (amorphous resins) | | |
| a | Cyclic olefin - ethylene copolymer | APL6015 made by Mitsui Chemicals Inc. | Glass transition temperature: 140° C. |
| b | Cyclic olefin - ethylene copolymer | APL6013 made by Mitsui Chemicals Inc. | Glass transition temperature: 125° C. |
| c | Cyclic olefin - ethylene copolymer | APL6509 made by Mitsui Chemicals Inc. | Glass transition temperature: 80° C. |
| d | Cyclic olefin - ethylene copolymer | APL5018 made by Mitsui Chemicals Inc. | Glass transition temperature: 160° C. |
| e | Cyclic olefin - ethylene copolymer | APL6011 made by Mitsui Chemicals Inc. | Glass transition temperature: 105° C. |
| f | Cycloolefinic polymer | Zeonor 1020R made by Zeon Corporation | Glass transition temperature: 105° C. |
| | (polyolefinic resins) | | |
| α | Highly crystalline propylene homopolymer | MA4U made by Nippon Polychem Corporation | MFR 5.0 g/10 min, Crystallinity 60 percent, melt peak temperature 165° C., melt completion temperature 171° C. |
| β1 | Propylene homopolymer | MA4 made by Nippon Polychem Corporation | MFR 5.0 g/10 min, melt peak temperature 160° C., melt completion temperature 167° C. |
| β2 | Propylene homopolymer | EA9 made by Nippon Polychem Corporation | MFR 0.5 g/10 min, melt peak temperature 160° C., melt completion temperature 167° C. |
| γ | Ethylene homopolymer | HJ360 made by Nippon Polychem Corporation | MFR 5.5 g/10 min, melt peak temperature 130° C., melt completion temperature 135° C. |
| | (Inorganic finepowders and the like) | | |
| A | Surface-treated precipitated calcium carbonate | MC-S5 made by Maruo Calcium Co., Ltd. | Average particle size: 0.1 micrometer, treated with a fatty acid and sulfonic acid |
| B | Surface-treated precipitated calcium cabonate | MSK-PO made by Maruo Calcium Co., Ltd. | Average particle size: 0.15 micrometers, treated with a fatty acid |
| C | Precipitated calcium carbonate | Brilliant-15 made by Shiroishi Kogyo (K.K.) | Average particle size: 0.15 micrometers |
| D | Heavy calcium carbonate | Softon #3200 made by Bihoku Hunka Kogyo (K.K.) | Average particle size: 0.7 micrometers |
| E | Heavy calcium carbonate | Soften #1800 made by Bihoku Hunka Kogyo (K.K) | Average particle size: 1.25 micrometers |
| F | Kaolin clay | Ultrawhite-90 made by Engelhard Corporation | |
| G | Silica-compounded acrylic emulsion | Movinyl M8010 made by Clariant Polymers K.K. | |
| H | Specially modified polyvinyl alcohol | Gohsefimer Z-100 made by Nippon Synthetic Chemical Industry Co., Ltd. | |
| I | Special sodium polycarbonate | Poiz 520 made by Kao Corporation | |
| J | Polyamide urea-based resin | Sumiraze Resin 633 made by Sumitomo Chemical Co., Ltd. | |

EXAMPLE 1

The amorphous resin, the polyolefinic resin and the inorganic finepowder, that are indicated in Table 3, were admixed in amounts shown in Table 3 to prepare composition (A). Composition (A) was melted and kneaded in an extruder set to 270° C. extruded through a die to obtain a sheet, and cooled by a cooling device to obtain an unstretched sheet. This sheet was heated to 155° C. and longitudinally stretched five-fold by exploiting the difference in peripheral speed of a group of rolls. The five-fold stretched sheet was then heated to 155° C. transversely stretched 7.5-fold with a tenter, and annealed at 163° C. yielding a single-layer film. The surface of the single-layer film was treated by corona discharge, yielding a stretched film of single-layer structure consisting solely of a layer (A) (having a film thickness of 150 micrometers).

EXAMPLE 2

The amorphous resin, the polyolefinic resin and the inorganic finepowder, that are indicated in Table 3, were admixed in amounts shown in Table 3 to prepare composition (A). Separately, 40 wt % of heavy calcium carbonate (E) was added to a mixture containing 50 wt % of propylene homopolymer (β1) and 10 wt % of high-density polyethylene (γ) to obtain composition (B). Heavy calcium carbonate (E), propylene homopolymer (β1) and high-density polyethylene (γ) are indicated in Table 2. Compositions (A) and (B) were melted and kneaded in separate extruders set to 270° C., laminated in a die to achieve the configuration (B)/(A)/(B), coextruded through a single die, and cooled by a cooling device to obtain an unstretched sheet. This sheet was heated to 155° C. and longitudinally stretched five-fold by exploiting the difference in peripheral speed of a group of rolls. The three-layer laminate was heated to 155° C. transversely stretched 7.5-fold with a tenter, and annealed at 163° C. to obtain a three-layer film. The surface of the three-layer film was treated by corona discharge, yielding a stretched film of three-layer structure consisting of layers (B)/(A)/(B) (the thickness of the individual layers being 5/110/5 micrometers).

EXAMPLE 3

The amorphous resin, the polyolefinic resin and the inorganic finepowder, that are indicated in Table 3, were admixed in amounts shown in Table 3 to prepare composition (A). Composition (A) was melted and kneaded in an extruder set to 270° C. extruded through a die to obtain a sheet, and cooled by a cooling device to obtain an unstretched sheet. This sheet was heated to 150° C. longitudinally stretched five-fold by exploiting the difference in peripheral speed of a group of rolls, and annealed at 155° C. to obtain a single-layer film. The surface of the single-layer film was treated by corona discharge, yielding a stretched resin film of single-layer structure consisting solely of layer (A) (having a film thickness of 150 micrometers).

EXAMPLE 4

The amorphous resin, the polyolefinic resin and the inorganic finepowder, that are indicated in Table 3, were admixed in amounts shown in Table 3 to prepare composition (A). Separately, 40 wt % of heavy calcium carbonate (E) was added to a mixture containing 50 wt % of propylene homopolymer (β1) and 10 wt % of high-density polyethylene (γ) to obtain composition (B). Heavy calcium carbonate (E), propylene homopolymer (β1) and high-density polyethylene (γ) are indicated in Table 2. Compositions (A) and (B) were melted and kneaded in separate extruders set to 270° C. laminated in a die to achieve the configuration (B)/(A)/(B), coextruded through a single die, and cooled by a cooling device to obtain an unstretched sheet. This sheet was heated to 150° C. longitudinally stretched five-fold by exploiting the difference in peripheral speed of a group of rolls, and annealed at 155° C. to obtain a three-layer film. The surface of the three-layer film was treated by corona discharge, yielding a stretched resin film of three-layer structure consisting of layers (B)/(A)/(B) (the thickness of the individual layers being 15/130/15 micrometers).

COMPARATIVE EXAMPLE 1

Inorganic finepowder was blended into a mixture of the different types and amounts of polyolefinic resins indicated in Table 3 to obtain composition (A). Separately, 40 wt % of heavy calcium carbonate (E) was added to a mixture containing 50 wt % of the propylene homopolymer (β1) and 10 wt % of the high-density polyethylene (γ) indicated in Table 2 to obtain composition (B). Heavy calcium carbonate (E), propylene homopolymer (β1) and high-density polyethylene (γ) are indicated in Table 2. Compositions (A) and (B) were melted and kneaded in separate extruders set to 270° C. laminated in a die to achieve the configuration (B)/(A)/(B), coextruded through a single die, and cooled by a cooling device to obtain an unstretched sheet. This sheet was heated to 155° C. and longitudinally stretched five-fold by exploiting the difference in peripheral speed of a group of rolls. The three-layer laminate was heated to 155° C. transversely stretched 7.5-fold with a tenter, and annealed at 163° C. to obtain a three-layer film. The surface of the three-layer film was treated by corona discharge, yielding a stretched film of three-layer structure consisting of layers (B)/(A)/(B) (the thickness of the individual layers being 5/110/5 micrometers).

EXAMPLES 5 TO 16 AND COMPARATIVE EXAMPLE 2

Composition (B) was prepared by blending 12 wt % of heavy calcium carbonate (E) into a mixture containing 80 wt % of the propylene homopolymer (β2) and 8 wt % of the high-density polyethylene (γ). These compounds are indicated in Table 2. Composition (B) was melted and kneaded in an extruder set to 270° C. extruded through a die to obtain a sheet, and cooled by a cooling device to obtain an unstretched sheet. The sheet was heated to 140° C. and longitudinally stretched five-fold by exploiting the difference in peripheral speed of a group of rolls.

Separately, the amorphous resin, the polyolefinic resin and the inorganic finepowder, that are indicated in Table 4, were admixed in amounts shown in Table 4 to prepare composition (A). Composition (D) was prepared by mixing 50 wt % of the propylene homopolymer (β1) indicated in Table 2 and 50 wt % of the heavy calcium carbonate (E) indicated in Table 2. Compositions (A) and (D) were melted and kneaded in separate extruders set to 270° C. laminated in a die, and coextruded through a single die to obtain a sheet. This sheet was laminated onto the five-fold stretched sheet (B) obtained above with layer (A) facing outward. Another laminate of layers (A) and (D) were also laminated onto the opposite side with layer (A) facing outward to obtain a five-layer laminate.

The five-layer laminate was heated to 163° C. transversely stretched 7.5-fold with a tenter, and annealed at 167° C. to obtain a five-layer laminate film. The surface of the five-layer laminate film was treated by corona discharge to obtain a (A)/(D)/(B)/(D)/(A) five-layer structure multilayered stretched resin film (with the thickness of the individual layers being 15/25/70/25/15 micrometers).

This manufacturing method was repeated by varying the types and amounts of amorphous resin, polyolefinic resin and inorganic finepowder in layer (A) as indicated in Table 4 to obtain 13 kinds of multilayered stretched resin films of Examples 5 to 16 and Comparative Example 2.

EXAMPLES 17 TO 19

Composition (B) was prepared by blending 12 wt % of heavy calcium carbonate (E) into the mixture of 80 wt % of propylene homopolymer (β2) and 8 wt % of high-density polyethylene (γ). Heavy calcium carbonate (E), propylene homopolymer (β2) and high-density polyethylene (γ) are indicated in Table 2. Composition (B) was melted and kneaded in an extruder set to 270° C., extruded through a die to obtain a sheet, and cooled by a cooling device to obtain an unstretched sheet. The sheet was heated to 140° C. and longitudinally stretched five-fold by exploiting the difference in peripheral speed of a group of rolls.

Separately, the amorphous resin, the polyolefinic resin and the inorganic finepowder, that are indicated in Table 4, were admixed in amounts shown in Table 4 to prepare composition (A). Composition (D) was prepared by mixing 50 wt % of the propylene homopolymer (β1t 1) indicated in Table 2 and 50 wt % of the heavy calcium carbonate (E) indicated in Table 2. Further, 50 wt % of highly crystalline propylene homopolymer (α), 25 wt % of amorphous resin (b), and 25 wt % of amorphous resin (e) were admixed to obtain composition (C). Highly crystalline propylene homopolymer (α), amorphous resin (b) and amorphous resin (e) are indicated in Table 2. Compounds (A), (D), and (C) were melted and kneaded in separate extruders set to 270° C. laminated in a die, and coextruded through a single die to obtain a sheet. This sheet was then laminated onto one side of the five-fold stretched sheet (B) obtained above to achieve the configuration (A)/(C)/(D)/(B), and was laminated on the other side thereof to obtain a seven-layer laminate in the form of (A)/(C)/(D)/(B)/(D)/(C)/(A).

The seven-layer laminate was heated to 163° C. transversely stretched 7.5-fold with a tenter, and annealed at 167° C. to obtain a seven-layer laminate film. The surface of this seven-layer film was treated by corona discharge, yielding a multilayered stretched resin film having seven layer structure of (A)/(C)/(D)/(B)/(D)/(C)/(A) (the thickness of the individual layers being 10/5/25/70/25/5/10 micrometers).

This manufacturing method was repeated by varying the types and amounts of amorphous resin, polyolefinic resin and inorganic finepowder in layer (A) as indicated in Table 4 to obtain 3 kinds of multilayered stretched resin films of Examples 17 to 19.

EXAMPLE 20

Composition (B) was prepared by blending 2 wt % of heavy calcium carbonate (E) into the mixture of 90 wt % of propylene homopolymer (β2) and 8 wt % of ethylene homopolymer (γ). Heavy calcium carbonate (E), propylene homopolymer (β2) and ethylene homopolymer (γ) are indicated in Table 2. Composition (B) was melted and kneaded in an extruder set to 270° C. extruded through a die to obtain a sheet, and cooled by a cooling device to obtain an unstretched sheet. The sheet was heated to 155° C. and longitudinally stretched five-fold by exploiting the difference in peripheral speed of a group of rolls.

Separately, the amorphous resin, the polyolefinic resin and the inorganic finepowder, that are indicated in Table 4, were admixed in amounts shown in Table 4 to prepare composition (A). Composition (A) was melted and kneaded in an extruder set to 270° C. and extruded through a die to obtain a sheet. This sheet was then laminated onto one side of the five-fold stretched sheet (B) obtained above. The sheet of layer (A) was also laminated onto the opposite side of five-fold stretched sheet (B) to obtain a three-layer laminate.

The three-layer laminate was heated to 175° C. and transversely stretched 7.5-fold with a tenter to obtain a three-layer laminate film. The surface of the three-layer laminate film was treated by corona discharge, yielding an (A)/(B)/(A) three-layer structure multilayered stretched resin film (the thickness of the individual layers being 25/100/25 micrometers).

EXAMPLE 21

Composition (B) was prepared by blending 12 wt % of heavy calcium carbonate (E) into the mixture of 80 wt % of propylene homopolymer (β12) and 8 wt % of high-density polyethylene (γ). Heavy calcium carbonate (E), propylene homopolymer (β2) and high-density polyethylene (γ) are indicated in Table 2. Composition (B) was melted and kneaded in an extruder set to 270° C. extruded through a die to obtain a sheet, and cooled by a cooling device to obtain an unstretched sheet. The sheet was heated to 140° C. and longitudinally stretched five-fold by exploiting the difference in peripheral speed of a group of rolls.

Separately, the amorphous resin, the polyolefinic resin and the inorganic finepowder, that are indicated in Table 4, were admixed in amounts shown in Table 4 to prepared composition (A). Composition (A) was melted and kneaded in an extruder set to 270° C. and extruded through a die to obtain a sheet. This sheet was then laminated onto one side of the five-fold stretched sheet (B) obtained above. The sheet of layer (A) was also laminated onto the opposite side of five-fold stretched sheet (B) to obtain a three-layer laminate.

The three-layer laminate was heated to 163° C. transversely stretched 7.5-fold with a tenter, and annealed at 167° C. to obtain a three-layer laminate film. The surface of the three-layer laminate film was treated by corona discharge, yielding an (A)/(B)/(A) three-layer structure multilayered stretched resin film (the thickness of the individual layers being 35/70/35 micrometers).

EXAMPLE 22

Composition (B) was prepared by blending 12 wt % of heavy calcium carbonate (E) into the mixture of 80 wt % of propylene homopolymer (β2) and 8 wt % of high-density polyethylene (γ). Heavy calcium carbonate (E), propylene homopolymer (β2) and high-density polyethylene (γ) are indicated in Table 2. Separately, the amorphous resin, the polyolefinic resin and the inorganic finepowder, that are indicated in Table 4, were admixed in amounts shown in Table 4 to prepare composition (A). Compositions (A) and (B) were melted and kneaded in separate extruders set to 270° C. laminated in a die to achieve the configuration (A)/(B)/(A), coextruded through a single die, and cooled by a cooling device to obtain an unstretched sheet. This sheet was heated to 155° C. and longitudinally stretched five-fold by exploiting the difference in peripheral speed of a group of rolls. The three-layer laminate was heated to 155° C. transversely stretched 7.5-fold, and annealed at 163° C. to obtain a three-layer film. The surface of the three-layer film was treated by corona discharge, yielding a stretched resin film of three-layer structure consisting of layers (A)/(B)/(A) (the thickness of the individual layers being 20/80/20 micrometers).

EXAMPLE 23

Composition (B) was prepared by blending 30 wt % of heavy calcium carbonate (E) into the mixture of 62 wt % of propylene homopolymer (β2) and 8 wt % of high-density polyethylene (γ). Heavy calcium carbonate (E), propylene homopolymer (β2) and high-density polyethylene (γ) are indicated in Table 2. Separately, the amorphous resin, the polyolefinic resin and the inorganic finepowder, that are indicated in Table 4, were admixed in amounts shown in Table 4 to prepare composition (A). Compositions (A) and (B) were melted and kneaded in separate extruders set to 270° C. coextruded through a single die to achieve the configuration (A)/(B)/(A), and cooled by a cooling device to obtain an unstretched sheet. This sheet was heated to 155° C. longitudinally stretched five-fold by exploiting the difference in peripheral speed of a group of rolls, and annealed at 163° C. to obtain a three-layer film. The surface of the three-layer film was treated by corona discharge, yielding a stretched resin film of three-layer structure consisting of layers (A)/(B)/(A) (the thickness of the individual layers being 25/100/25 micrometers).

COMPARATIVE EXAMPLE 3

A multilayered stretched resin film having five-layer structure (the thickness of the individual layers being 10/15/50/15/10 micrometers) was obtained in the same manner as in Example 11 of Japanese Unexamined Patent Publication (KOKAI) Heisei No. 8-276540.

EXAMPLES 24 TO 33

An aqueous coating mixture was prepared by mixing 50 wt % of light calcium carbonate (C), 10 wt % of kaolin clay (F), 35 wt % of silica-compounded acrylic emulsion (G), and 5 wt % of specially modified polyvinyl alcohol (H) (the blending proportions are given based on solid components). The obtained coating mixture was applied in 10 g/m² on one side of the multilayered stretched resin films obtained in Examples 1 to 4, 8, 10, 11, and 21 to 23, and dried for 1 min at 105° C. to obtain coated films.

In the above process, light calcium carbonate (C) and kaolin clay (F) were used after 0.5 weight parts of special sodium polycarbonate (I) were blended thereto as dispersing agent per 100 weight parts of light calcium carbonate (C) or kaolin clay (F). Specially modified polyvinyl alcohol (H) was used after 10 weight parts of polyamide urea-based resin (J) were blended thereto as crosslinking agent per 100 weight parts of specially modified polyvinyl alcohol (H).

EXAMPLES 34

Composition (B) was prepared by adding 12 wt % of heavy calcium carbonate (E) to a mixture containing 80 wt % of propylene homopolymer (β2) and 8 wt % of high-density polyethylene (γ). Heavy calcium carbonate (E), propylene homopolymer (β2) and high-density polyethylene (γ) are indicated in Table 2. Composition (B) was melted and kneaded in an extruder set to 270° C. extruded through a die, and cooled by a cooling device to obtain an unstretched sheet. This sheet was heated to 140° C. and longitudinally stretched five-fold by exploiting the difference in peripheral speed of a group of rolls.

Separately, composition (A) was prepared by admixing the amorphous resin, the polyolefinic resin and the inorganic finepowder, that are indicated in Table 7, in amounts shown in Table 7. Separately, 50 wt % of propylene homopolymer (β1) and 50 wt % of heavy calcium carbonate (E) were admixed to obtain composition (D). Further, 50 wt % of highly crystalline propylene homopolymer (α), 25 wt % of amorphous resin (b), and 25 wt % of amorphous resin (e) were admixed to obtain composition (C). Still further, 60 wt % of propylene homopolymer (β1) and 40 wt % of heavy calcium carbonate (E) were admixed to obtain composition (B'). These materials are indicated in Table 2.

Compositions (A), (D) and (C) were melted and kneaded in separate extruders set to 270° C. laminated in a die, and coextruded through a single die to obtain a sheet. This sheet was laminated onto one side of the five-fold stretched sheet (B) obtained above to obtain the layer structure of (A)/(C)/(D)/(B). Another laminate of layers (B'), (C) and (D) were also laminated onto the opposite side of the stretched sheet (B) to obtain a (A)/(C)/(D)/(B)/(D)/(C)/(B') seven-layer laminate.

The seven-layer laminate was heated to 163° C. transversely stretched 7.5-fold with a tenter, and annealed at 167° C. to obtain a seven-layer laminate film. The surface of the seven-layer laminate film was treated by corona discharge to obtain a (A)/(C)/(D)/(B)/(D)/(C)/(B') seven-layer structure multilayered stretched resin film (with the thickness of the individual layers being 10/5/25/70/25/5/10 micrometers).

TEST EXAMPLE

The stretched resin films obtained in Examples 1 to 33 and Comparative Examples 1 to 3 were tested to evaluate their opacity and porosity, their suitability for offset printing (i.e., waving after printing with a commercial printing machine, ink drying properties, and picking). The results are shown in Tables 3 to 6.

(1) Opacity

Opacity was measured in compliance with JIS P-8138.

(2) Porosity

The porosity (%) of layer (A) and layer (B) is determined by observing a cross-section of the multilayered stretched resin film under a scanning electron microscope, and then estimating the ratio of the area of the voids to the total area of layer (A) and layer (B).

(3) Generation of Surface Waving After Commercial Printing

The multilayered stretched resin film to be evaluated was subjected to 1,000-sheet continuous printing with a four-color offset printing machine (product of Mitsubishi Heavy Industries, Ltd., Model OF-4) using four colors of drying-type offset printing inks (product of T&K TOKA Company, SUPERTECH Black, Cyan, Magenta and Yellow) with a transfer amount of 1.5 g/m² for each color. The resulting printed matter was allowed to stand while stacked in a columnar fashion. After the inks dried, the waving of the film was judged by sensory evaluation.

Evaluation criteria are as follows:
  5: no waving;
  4: waving recognizable but non-problematic;
  3: waving recognizable;
  2: a little serious waving and problematic; and
  1: serious waving.

(4) Ink Drying Property

The multilayered stretched resin film to be evaluated was subjected to 1,000-sheet continuous printing with a four-color offset printing machine (product of Mitsubishi Heavy Industries, Ltd., Model OF-4) using four colors of drying-type offset printing inks (product of T&K TOKA Company, SUPERTECH Black, Cyan, Magenta and Yellow) with a transfer amount of 1.5 g/m² for each color. The resulting printed matter was allowed to stand while stacked in a columnar fashion, and sampled at predetermined time intervals to determine the state of dryness of the ink. Evaluation criteria for the ink drying property are as follows:

5: very rapid;

4: rapid;

3: non-problematic level;

4: a little slow and problematic; and

5: very slow.

(5) Picking

The multilayered stretched resin film to be evaluated was subjected to 5,000-sheet continuous printing with a four-color offset printing machine (product of Mitsubishi Heavy Industries, Ltd., Model OF-4) using four colors of drying-type offset printing inks (product of T&K TOKA Company, SUPERTECH Black, Cyan, Magenta and Yellow) with a transfer amount of 1.5 g/m² for each color. Picking occurrence in the resulting printed matter was evaluated. Evaluation criteria for the picking occurrence are as follows:

5: no occurrence;

4: occurred but non-problematic level;

3: occurred;

4: occurred slight-seriously and problematic; and

5: seriously occurred.

TABLE 3

| | Composition of Layer (A) | | | | | | | | | | | Suitability for offset printing |
| | Amorphous resin | | | Polyolefinic resin | | Inorganic finepowder | | | Layer (B) | | | | | Surface waving after |
| | Type | Glass trans. temp. (° C.) | Content (wt %) | Type | Content (wt %) | Type | Content (wt %) | Stretching direction | Presence | Stretching direction | Opacity of film (%) | Porosity (%) Layer (A) | Porosity (%) Layer (B) | commercial printing |
|---|---|---|---|---|---|---|---|---|---|---|---|---|---|---|
| Ex. 1 | c | 80 | 60 | α | 37 | E | 3 | biaxial | no | — | 49 | 8 | — | 5 |
| Ex. 2 | e | 105 | 45 | α | 40 | C | 15 | biaxial | yes | biaxial | 92 | 30 | 45 | 5 |
| Ex. 3 | f | 105 | 50 | α | 47 | E | 3 | uniaxial | no | — | 45 | 6 | — | 5 |
| Ex. 4 | f | 105 | 45 | α | 40 | E | 15 | uniaxial | yes | uniaxial | 88 | 21 | 34 | 5 |
| Comp. Ex. 1 | — | — | — | β 1 γ | 808 8 | E | 12 | biaxial | yes | biaxial | 96 | 23 | 45 | 1 |

TABLE 4

| | Composition of layer (A) | | | | | | | Layer (B) | |
| | Amphorous resin | | | Polyolefinic resin | | Inorganic finepowder | | | |
| | Type | Glass trans. temp. (° C.) | Content (wt %) | Type | Content (wt %) | Type | Content (wt %) | Stretching direction | Stretching direction |
|---|---|---|---|---|---|---|---|---|---|
| Ex. 5 | a | 140 | 35 | α | 35 | B | 30 | uniaxial | biaxial |
| Ex. 6 | b | 125 | 35 | α | 35 | B | 30 | uniaxial | biaxial |
| Ex. 7 | c | 80 | 35 | α | 35 | B | 30 | uniaxial | biaxial |
| Ex. 8 | e | 105 | 35 | α | 35 | B | 30 | uniaxial | biaxial |
| Ex. 9 | f | 105 | 35 | α | 35 | B | 30 | uniaxial | biaxial |
| Ex. 10 | e | 105 | 25 | α | 25 | B | 50 | uniaxial | biaxial |
| Ex. 11 | e | 105 | 35 | α | 35 | A | 30 | uniaxial | biaxial |
| Ex. 12 | e | 105 | 35 | α | 35 | C | 30 | uniaxial | biaxial |
| Ex. 13 | e | 105 | 35 | α | 35 | D | 30 | uniaxial | biaxial |
| Ex. 14 | e | 105 | 35 | β 1 | 35 | B | 30 | uniaxial | biaxial |
| Ex. 15 | e | 105 | 30 | β 1 γ | 20 20 | B | 30 | uniaxial | biaxial |
| Ex. 16 | e | 105 | 5 | α | 55 | A | 40 | uniaxial | biaxial |
| Ex. 17 | c | 80 | 5 | β 1 | 40 | B | 55 | uniaxial | biaxial |
| Ex. 18 | e | 105 | 25 | α | 25 | B | 50 | uniaxial | biaxial |
| Ex. 19 | a | 105 | 35 | α | 35 | C | 30 | uniaxial | biaxial |
| Ex. 20 | e | 105 | 40 | α | 55 | B | 5 | uniaxial | biaxial |
| Ex. 21 | e | 105 | 35 | α | 35 | B | 30 | uniaxial | biaxial |
| Ex. 22 | c | 80 | 45 | α | 45 | B | 10 | biaxial | biaxial |

TABLE 4-continued

| | | | | | | | | | | |
|---|---|---|---|---|---|---|---|---|---|---|
| Ex. 23 | c | 80 | 40 | α | 20 | B | 40 | uniaxial | uniaxial | |
| Comp. Ex. 2 | d | 160 | 50 | β | 1 | 30 | B | 20 | uniaxial | biaxial |
| Comp. Ex. 3 | Five-layer structure stretched resin film of Example 11 described in Japanese Unexamined Patent Publication (KOKAI) Heisei No. 8-276540. | | | | | | | | | |

| | | | | | Suitability for offset printing | | |
|---|---|---|---|---|---|---|---|
| | Presence | Presence | Opacity | Porosity (%) | | Surface waving after | Ink |
| | of layer (C) | of layer (D) | of film (%) | Layer (A) | Layer (B) | commercial printing | drying property | Picking |
| Ex. 5 | no | yes | 96 | 23 | 28 | 4 | 3 | 5 |
| Ex. 6 | no | yes | 95 | 21 | 28 | 4 | 3 | 5 |
| Ex. 7 | no | yes | 95 | 20 | 28 | 4 | 3 | 5 |
| Ex. 8 | no | yes | 95 | 21 | 28 | 4 | 3 | 5 |
| Ex. 9 | no | yes | 95 | 21 | 28 | 4 | 3 | 5 |
| Ex. 10 | no | yes | 96 | 34 | 28 | 4 | 5 | 5 |
| Ex. 11 | no | yes | 95 | 21 | 28 | 4 | 3 | 5 |
| Ex. 12 | no | yes | 95 | 21 | 28 | 4 | 3 | 5 |
| Ex. 13 | no | yes | 95 | 21 | 28 | 4 | 3 | 5 |
| Ex. 14 | no | yes | 95 | 21 | 28 | 4 | 3 | 5 |
| Ex. 15 | no | yes | 95 | 21 | 28 | 4 | 3 | 5 |
| Ex. 16 | no | yes | 95 | 26 | 28 | 3 | 4 | 5 |
| Ex. 17 | yes | yes | 94 | 37 | 28 | 5 | 5 | 5 |
| Ex. 18 | yes | yes | 96 | 34 | 28 | 5 | 5 | 5 |
| Ex. 19 | yes | yes | 95 | 21 | 28 | 5 | 3 | 5 |
| Ex. 20 | no | no | 36 | 7 | 6 | 5 | 3 | 5 |
| Ex. 21 | no | no | 82 | 21 | 28 | 4 | 3 | 5 |
| Ex. 22 | no | no | 80 | 13 | 24 | 4 | 3 | 5 |
| Ex. 23 | no | no | 92 | 24 | 29 | 4 | 4 | 5 |
| Comp. Ex. 2 | no | yes | 96 | 21 | 28 | 1 | 3 | 4 |
| Comp. Ex. 3 | Five-layer structure stretched resin film of Example 11 described in Japanese Unexamined Patent Publication KOKAI) Heisei No. 8-276540. | | | | | 1 | 4 | 3 |

TABLE 5

| | | Composition of layer (A) | | | | | | | | | Suitability for offset printing | | |
|---|---|---|---|---|---|---|---|---|---|---|---|---|---|
| | Ex. of | Amorphous resin | | | | | | | | | | | |
| | multi-layered stretched resin film | Type | Glass trans. temp. (° C.) | Content (wt %) | Polyolefinic resin Type | Content (wt %) | Inorganic finepowder Type | Content (wt %) | Stretching direction | Layer (B) Presence | Stretching direction | Opacity of film (%) | Surface waving after commercial printing | Ink drying property |
| Ex. 24 | Ex. 1 | c | 80 | 60 | α | 37 | E | 3 | biaxial | no | — | 55 | 5 | 5 |
| Ex. 25 | Ex. 2 | e | 105 | 45 | α | 40 | C | 15 | biaxial | yes | biaxial | 94 | 5 | 5 |
| Ex. 26 | Ex. 3 | f | 105 | 50 | α | 47 | E | 3 | uniaxial | no | — | 51 | 5 | 5 |
| Ex. 27 | Ex. 4 | f | 105 | 45 | α | 40 | E | 15 | uniaxial | yes | uniaxial | 90 | 5 | 5 |

TABLE 6

| | | Composition of layer (A) | | | | | | | | | Suitability for offset printing | | |
|---|---|---|---|---|---|---|---|---|---|---|---|---|---|
| | Ex. of | Amorphous resin | | | | | | | | | | | |
| | multi-layered stretched resin film | Type | Glass trans. temp. (° C.) | Content (wt %) | Polyolefinic resin Type | Content (wt %) | Inorganic finepowder Type | Content (wt %) | Stretching direction | Presence of layer (D) | Opacity of film (%) | Surface waving after commercial printing | Ink drying property |
| Ex. 28 | Ex. 8 | e | 105 | 35 | α | 35 | B | 30 | uniaxial | yes | 97 | 4 | 5 |
| Ex. 29 | Ex. 10 | e | 105 | 25 | α | 25 | B | 50 | uniaxial | yes | 98 | 4 | 5 |
| Ex. 30 | Ex. 11 | e | 105 | 35 | α | 35 | A | 30 | uniaxial | yes | 97 | 4 | 5 |
| Ex. 31 | Ex. 21 | e | 105 | 35 | α | 35 | B | 30 | uniaxial | no | 85 | 5 | 5 |

TABLE 6-continued

| Ex. of multi-layered stretched resin film | Composition of layer (A) | | | | | | | | Suitability for offset printing | | |
|---|---|---|---|---|---|---|---|---|---|---|---|
| | Amorphous resin | | | Polyolefinic resin | | Inorganic finepowder | | | | Surface | |
| | Type | Glass trans. temp. (° C.) | Content (wt %) | Type | Content (wt %) | Type | Content (wt %) | Stretching direction | Presence of layer (D) | Opacity of film (%) | waving after commercial printing | Ink drying property |
| Ex. 32 | Ex. 22 | c | 80 | 45 | α | 45 | B | 10 | biaxial | no | 83 | 5 | 5 |
| Ex. 33 | Ex. 23 | c | 80 | 40 | α | 20 | B | 40 | uniaxial | no | 94 | 5 | 5 |

TABLE 7

| Composition of layer (A) | | | | | | | | |
|---|---|---|---|---|---|---|---|---|
| Amphorous resin | | | Polyolefinic resin | | Inorganic finepowder | | | Layer (B) |
| Type | Glass trans. temp. (° C.) | Content (wt %) | Type | Content (wt %) | Type | Content (wt %) | Stretching direction | Stretching direction |
| Ex. 34 | c | 80 | 5 | β1 | 40 | B | 55 | uniaxial | biaxial |

| | Suitability for offset printing | | | | | | |
|---|---|---|---|---|---|---|---|
| Presence of layer (C) | Presence of layer (D) | Opacity of film (%) | Porosity (%) Layer (A) | Layer (B) | Surface waving after commercial printing | Ink drying property | Picking |
| Ex. 34 | yes | yes | 93 | 37 | 28 | 5 | 5 | 5 |

INDUSTRIAL APPLICABILITY

The stretched resin film of the present invention is resistant to waving due to contact with the vehicle of offset printing ink during offset printing. This ensures that the stretched resin films of the present invention have excellent printing properties. The stretched resin film of the present invention is particularly suitable for use as a material for maps, book covers, wrapping paper, book paper, sticker sheets, poster paper, menu sheets, hanging screens, labels, shopping bags, cardboard, brochures, illuminated sign boards, and so forth.

The present disclosure relates to the subject matter contained in Japanese Patent Application No. 298434/2000 filed on Sep. 29, 2000 and Japanese Patent Application No. 298435/2000 filed on Sep. 29, 2000, which are expressly incorporated herein by reference in its entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:
1. A stretched resin film comprising:
a layer (A) for receiving an offset ink, the layer (A) stretched in at least one axial direction and comprising 0 to 98 wt % of a polyolefinic resin, 2 wt % or more and less than 100 wt % of an amorphous resin having a glass transition temperature of 70 to 140° C. and more than 0 wt % and 70 wt % or less of an inorganic finepowder and/or an organic filler, wherein the amorphous resin comprises a resin comprising at least one polymer selected from the group consisting of a ring-opened polymer derived from a cyclic olefin monomer having the formula (1) below, a hydrogenated ring-opened polymer derived from a cyclic olefin monomer having the formula (1) below, a hydrogenated ring-opened copolymer derived from a cyclic olefin monomer having the formula (1), and a copolymer of ethylene and a cyclic olefin monomer having the formula (1):

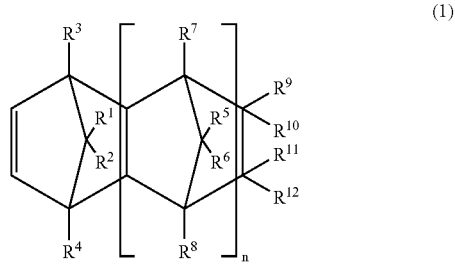

(1)

where "n" denotes 0 or a positive integer, $R^1$ to $R^{12}$ independently represents a hydrogen atom, a halogen atom or a hydrocarbon group, $R^9$ to $R^{12}$ are bound with each other to form a monocyclic or polycyclic group, in which said monocyclic or polycyclic group has a double bond, and $R^9$ and $R^{10}$ or $R^{11}$ and $R^{12}$ together form an alkylidene group, and wherein the layer (A) has a porosity of more than 5%.

2. The stretched resin film according to claim 1, wherein a layer (B) comprising 30 to 100 wt % of a polyolefinic resin, and 0 to 70 wt % of an inorganic finepowder and/or an organic filler is formed on at least one surface of the layer (A).

3. The stretched resin film according to claim 2, wherein the layer (A) is the outermost layer.

4. The stretched resin film according to claim 3, which has a layer structure selected from (A)/(B), (A)/(B)/(A), (A)/(B)/(A)/(B) and (A)/(B)/(A)/(B)/(A).

5. The stretched resin film according to claim 2, wherein the layer (B) is the outermost layer.

6. The stretched resin film according to claim 5, which has a layer structure selected from (B)/(A)/(B) and (B)/(A)/(B)/(A)/(B).

7. The stretched resin film according to claim 1, wherein the stretched resin film has a layer structure selected from (A)/(C), (A)/(B)/(C), (A)/(C)/(B), (A)/(C)/(A), (C)/(A)/(C), (A)/(B)/(C)/(B), (A)/(B)/(A)/(C), (A)/(C)/(A)/(B), (A)/(C)/(A)/(C), (C)/(A)/(B)/(C), (A)/(C)/(B)/(A), (A)/(C)/(B)/(C), (A)/(C)/(B)/(C)/(A), (A)/(B)/(C)/(A)/(B), (A)/(B)/(C)/(A)/(C), (A)/(B)/(C)/(B)/(A), (A)/(B)/(C)/(B)/(C), (A)/(B)/(A)/(B)/(C), (A)/(B)/(A)/(C)/(A), (A)/(B)/(A)/(C)/(B), (A)/(C)/(A)/(B)/(C), (A)/(C)/(A)/(C)/(A), (A)/(C)/(A)/(C)/(B), (A)/(C)/(B)/(A)/(B), (A)/(C)/(B)/(A)/(C), (A)/(C)/(B)/(C)/(B), (C)/(A)/(B)/(A)/(C), (C)/(A)/(C)/(A)/(C), (C)/(A)/(C)/(B)/(C) and (C)/(B)/(A)/(B)/(C), and wherein the layer (B) comprises 30 to 100 wt % of a polyolefinic resin and 0 to 70 wt % of an inorganic finepowder and/or an organic filler, and the layer (C) comprises 0 to 85 wt % of a polyolefinic resin and 15 to 100 wt % of an amorphous resin.

8. The stretched resin film according to claim 1, wherein the stretched resin film has a layer structure selected from (B)/(A)/(C), (B)/(A)/(B)/(C), (B)/(A)/(C)/(B), (B)/(A)/(C)/(A)/(B), (B)/(A)/(C)/(A)/(C), (B)/(A)/(C)/(B)/(C), (B)/(A)/(B)/(C)/(B), (B)/(C)/(A)/(B)/(C), (B)/(C)/(A)/(C)/(B) and (B)/(C)/(B)/(A)/(C), and wherein the layer (B) comprises 30 to 100 wt % of a polyolefinic resin and 0 to 70 wt % of an inorganic finepowder and/or an organic filler, and the layer (C) comprises 0 to 85 wt % of a polyolefinic resin and 15 to 100 wt % of an amorphous resin.

9. The stretched resin film according to claim 1, further comprising a layer comprising a pigment on at least one outermost surface of the stretched resin film.

10. The stretched resin film according to claim 1, wherein the polyolefinic resin is a propylene-based resin, an ethylene-based resin or a mixture thereof.

* * * * *